(12) United States Patent
Laffoon et al.

(10) Patent No.: US 7,463,147 B1
(45) Date of Patent: Dec. 9, 2008

(54) METHOD FOR IDENTIFICATION, TRACKING, AND NOTIFICATION OF ABANDONED ITEMS IN A STORE

(75) Inventors: Christopher M. Laffoon, Durham, NC (US); Travis M. Grigsby, Austin, TX (US); Viswanath Srikanth, Chapel Hill, NC (US); Craig W. Chaney, Apex, NC (US); Kathryn J. Lemanski, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/037,929

(22) Filed: Feb. 26, 2008

(51) Int. Cl.
*G08B 13/00* (2006.01)

(52) U.S. Cl. ............ 340/541; 340/539.13; 340/539.26; 340/540; 340/438; 340/439; 340/825.49; 340/572.1; 340/572.4; 235/383; 235/385; 235/492

(58) Field of Classification Search ................ 340/541, 340/539.13, 539.26, 540, 438, 439, 825.49; 340/572.1, 572.4; 235/383, 385, 492
See application file for complete search history.

(56) References Cited

U.S. PATENT DOCUMENTS

| | | | |
|---|---|---|---|
| 5,969,606 A | 10/1999 | Reber et al. | |
| 6,206,165 B1 | 3/2001 | Lenander | |
| 6,928,343 B2 | 8/2005 | Cato | |
| 7,057,495 B2 | 6/2006 | Debord et al. | |
| 7,091,861 B2 | 8/2006 | Schmidtberg et al. | |
| 7,183,910 B2 | 2/2007 | Alvarez et al. | |
| 7,209,042 B2 | 4/2007 | Martin et al. | |
| 7,242,300 B1 | 7/2007 | Konstad et al. | |
| 7,248,147 B2 | 7/2007 | Debord et al. | |
| 7,295,132 B2 * | 11/2007 | Steiner | 340/825.49 |
| 7,298,264 B1 | 11/2007 | Kuzma et al. | |
| 2003/0216969 A1 | 11/2003 | Bauer et al. | |
| 2005/0049914 A1 | 3/2005 | Parish | |
| 2005/0248455 A1 | 11/2005 | Pope et al. | |
| 2005/0258961 A1 | 11/2005 | Kimball et al. | |
| 2006/0032915 A1 | 2/2006 | Schwartz | |
| 2006/0255951 A1 * | 11/2006 | Roeder et al. | 340/572.7 |
| 2006/0259346 A1 | 11/2006 | Williamson | |
| 2007/0085682 A1 * | 4/2007 | Murofushi et al. | 340/572.1 |
| 2007/0115137 A1 | 5/2007 | Lyon et al. | |
| 2007/0290869 A1 | 12/2007 | Debord et al. | |
| 2008/0042836 A1 | 2/2008 | Christopher | |
| 2008/0061973 A1 | 3/2008 | Cato | |

OTHER PUBLICATIONS

Alexander et al., "IBM Business Consulting Service Applying Auto-ID to Reduce Losses Associated with Shrink," Nov. 1, 2002.

* cited by examiner

*Primary Examiner*—Tai T Nguyen
(74) *Attorney, Agent, or Firm*—Carpenter & Assoc.; Robert K. Carpenter

(57) ABSTRACT

Identifying abandoned shopping carts, including: providing shopping carts with locators; associating store areas with zone identifications, and providing store aisles with readers for the locators; associating carts with at least one zone; identifying carts and determining that carts entered new zones; determining an amount of time carts are in zones, and when carts are in an unassociated zone for a specified time, designating carts as abandoned and alerting personnel.

1 Claim, 1 Drawing Sheet

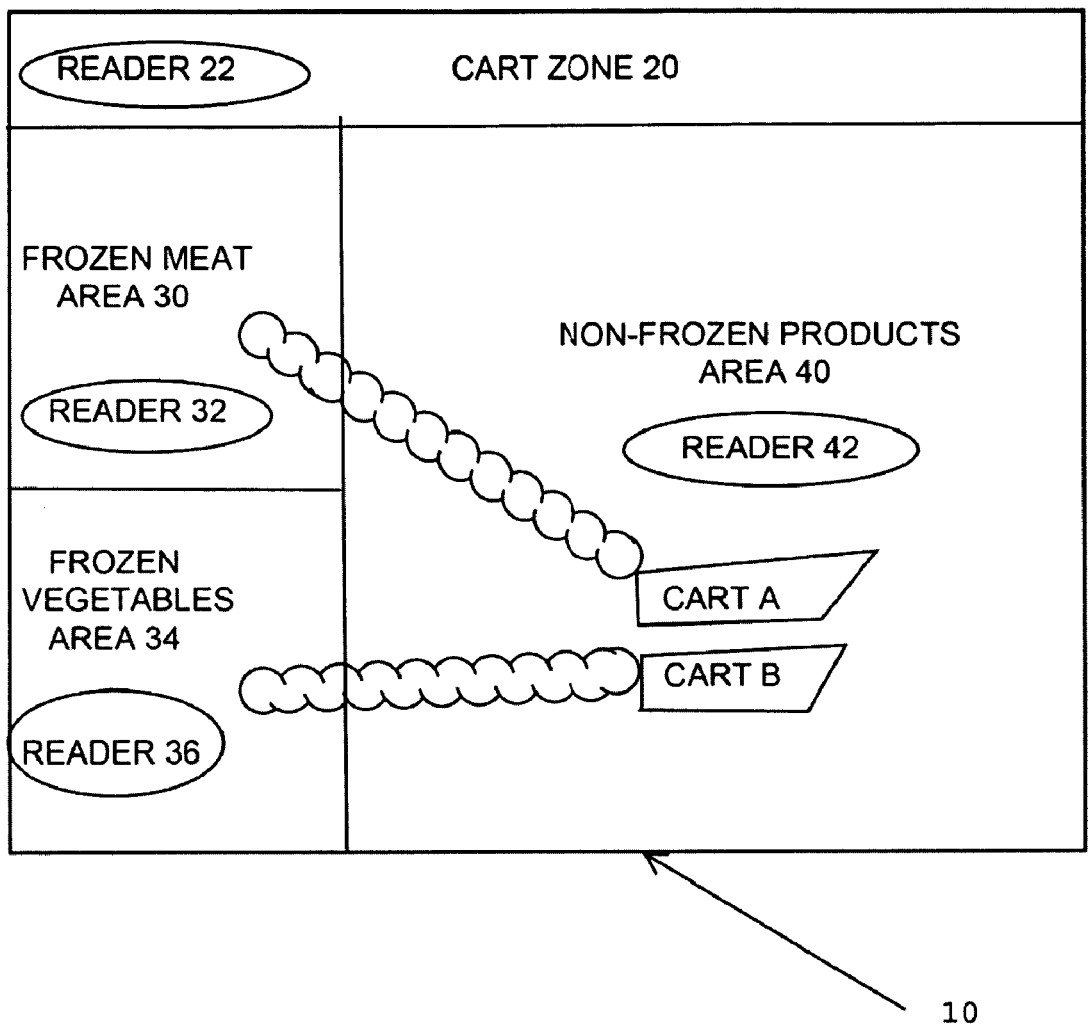

METHOD FOR IDENTIFICATION, TRACKING, AND NOTIFICATION OF ABANDONED ITEMS IN A STORE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTY TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

This disclosure is directed to a method for identification, tracking, and notification of abandoned items in a store.

(2) Description of Related Art Including Information Submitted under 37 CFR 1.97 and 1.98

Parish (U.S. Published Patent Application No. 20050049914) discloses systems and methods for a retail system. In paragraph [0138], Parish discloses that a shopper "may select an item and later reject the item and leave it in a different location and [the Parish system] can track these items for efficient restocking by the store personnel [and the] abandoned items that the RFID Sensor Reader . . . detects as in the [inappropriate] or wrong location can be rescued if perishable and ready for sale in all cases so that the stock of items are in the correct shelves . . . and aisles as intended by the merchandiser [and having] all products in the correct location reduces the spoilage and waste."

Debord et al. (U.S. Patent Publications Nos. 20070290869 and 20060061454 and U.S. Pat. Nos. 7,057,495 and 7,248,147) disclose perishable product electronic labels including time and temperature measurement.

The abstract of Kuzma et al. (U.S. Pat. No. 7,298,264) discloses an RFID system which utilizes "priority codes written into transponder memory fields of" RFID tags and based "on the use of this priority code, those items can be preferentially tracked as opposed to items of low value or size . . ."

BRIEF SUMMARY OF THE INVENTION

At least some aspects of this disclosure are directed to a method for identification, tracking, and notifying store personnel of abandoned grocery store shopping carts and/or abandoned products in a store to appropriate locations in the store.

More particularly, aspects of this disclosure are directed to a method for identification, tracking, and notification of abandoned items in a store, including: providing a plurality of shopping carts with locating devices so that the location of the shopping carts within a store can be identified and tracked; associating a plurality of areas in the store each with a particular zone identification, and providing each of the areas in the store with a reader that can identify specific shopping carts within the area; associating shopping carts with at least one zone; identifying shopping carts in each area and tracking shopping carts to determine when shopping carts have entered a new area to which the shopping carts are not associated; determining an amount of time shopping carts remain within new zones, and if shopping carts remain within a new zone for a specified period of time, designating the shopping carts as abandoned and alerting store personnel of abandoned carts and grocery store products; and wherein certain tracking of carts is assigned higher priority than other tracking of carts, such that a cart that has passed through a frozen meat products area will be assigned a higher priority than a cart that has passed through a frozen vegetables area but not through a frozen meat products area; and the cart that has passed through the frozen meat products area will result in an earlier abandonment alert than the cart that has passed through the frozen vegetables area but not the frozen meat products area.

At least some other aspects of this disclosure are directed to a system for identification, tracking, and notifying store personnel of abandoned grocery store shopping carts and/or abandoned products in a store to appropriate locations in the store.

Still other aspects of this disclosure are directed to a store utilizing the system and/or methods described in this disclosure for identification, tracking, and notifying store personnel of abandoned grocery store shopping carts and/or abandoned products in a store to appropriate locations in the store.

Yet other aspects of this disclosure are directed to a storage device, such as a computer or a storage media, such as a disk or the like, that includes software for operating the systems and methods of this disclosure for identification, tracking, and notifying store personnel of abandoned grocery store shopping carts and/or abandoned products in a store to appropriate locations in the store.

Other exemplary embodiments and advantages of this disclosure can be ascertained by reviewing the present disclosure and the accompanying drawing.

BRIEF DESCRIPTION OF THE SEVERAL VIEWS OF THE DRAWING

This disclosure is further described in the detailed description that follows, with reference to the drawing, which shows a plan view of a store layout according to at least some aspects of this disclosure.

DETAILED DESCRIPTION OF THE INVENTION

Exemplary embodiments of this disclosure are described herein by way of example.

As mentioned, at least one aspect of this disclosure is directed to a method for identification, tracking, and notifying store personnel of abandoned grocery store shopping carts and/or abandoned products in a store to appropriate locations in the store.

Shopping carts containing products in stores can find their way into locations within the store where the shopping carts are not normally supposed to be, and can be abandoned in such not-normal locations. Stores can lose money in the form of time lost looking for and then reshelving abandoned items, and in particular, in situations where perishable goods are removed from their refrigerators or freezers and left elsewhere in the store to thaw, melt, rot, etc. Entire carts full of items can be taken off of shelves, and simply abandoned in an aisle somewhere where many of the items can become worthless.

There can also be specific dangers in leaving particular items in certain incorrect locations; For example, leaving something corrosive and leaky in the produce section, though it may not happen often, can result, for example, in an entire crate of apples having to be discarded.

Aspects of this disclosure enable quicker location of abandoned items in a store so that the items can be restocked before they become worthless. One aspect of this disclosure is the utilization of multiple zones—this aspect can help bring vagrant items back in line. Typically, store employees will not be aware of such abandoned items.

Aspects of this disclosure are directed to methods for tracking abandoned items in stores and notifying store employees of the status of these items. This can include the defining of a plurality of zones in a store and defining which items belong in which zones. When shopping carts are in the wrong zone for long enough, they can be flagged as abandoned. In some embodiments, this disclosure can be directed to individual abandoned items and also to abandoned shopping carts.

An exemplary embodiment is disclosed below in conjunction with the attached FIGURE, which illustrates a plan view of an exemplary store layout in accordance with aspects of this disclosure.

PRIMARY ABANDONED CART/ITEM EMBODIMENT

1. Each shopping cart, for example CART A and CART B in the FIGURE has an individual locator or tag, for example an embedded RFID tag.
2. Each area of the store, such as store 10 in the FIGURE, has a particular zone ID associated with it. For example, in the FIGURE, the illustrative zones include cart zone 20 with reader 22, frozen meat area 30 with reader 32, frozen vegetables area 34 with reader 36, and non-frozen products area 40 with reader 42, although a typical store will likely have more zones than the illustrative FIGURE. The readers 22, 32, 36, and 42 can be mounted strategically to be able to, for example, conduct rough triangulation of carts located in the zone.
3. When a cart is identified by a reader in a zone or area for a first time, the cart has officially entered a new zone. For example, in the FIGURE, reader 42 will identify CART A, which has moved from frozen meat area 30 to non-frozen products area 40 and was previously (but no longer) identified by reader 32. Similarly, reader 42 will also identify CART B, which has moved from frozen vegetables area 34 and was previously (but no longer) identified by reader 36.
4. If a given cart remains within the same zone, i.e. it has not been in range of a different reader, for example, for 15 minutes, it is designated as abandoned, and an alert is raised in the store loss prevention software.

ADDITIONAL CONSIDERATIONS

1. Alternative embodiments of this disclosure can utilize techniques other than RFID, for example utilizing a system or apparatus that can locate and track items. GPS, for example, is a relatively expensive, yet workable alternative that can be utilized.
2. Zones can be defined at any degree of granularity—as long as enough readers are around to conduct a rough triangulation of the location of a given item, an item can be considered out of place if it is simply moved to the other side of the aisle.
3. It is desirable to allow customization of abandonment timers. Certain zones, items, or zone/item combinations may have higher priority than others—for example, frozen meat, which could be chicken or any other meat, can be more dangerous to leave out of a freezer area, such as frozen meat area 30, than frozen vegetables left out of a frozen vegetables zone, such as frozen vegetables area 34, which could be for example frozen peas, though they both can become worthless and unsellable after they have been out of the freezer for a short period of time. Thus, an alert can be issued sooner when CART A, which has passed through the frozen meat area 30 is detected by reader 42 in the non-frozen Products area 40, than when CART B, which has passed through the frozen vegetables area 34, but not through the frozen meat area 30, is detected by reader 42. Similarly, an alert can be issued sooner for a cart that has passed through the frozen vegetables zone 34 than would be issued if a cart were simply detected outside of the cart zone 20 but not tracked through frozen meat area 30 nor frozen vegetables area 34 (nor through any other higher priority zones that could be designated by the store).

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A method for identification, tracking, and notification of abandoned items in a store, comprising:
   providing a plurality of shopping carts with locating devices so that the location of the shopping carts within a store can be identified and tracked;
   associating a plurality of areas in the store each with a particular zone identification, and providing each of the areas in the store with a reader that can identify specific shopping carts within the area;
   associating shopping carts with at least one zone;
   identifying shopping carts in each area and tracking shopping carts to determine when shopping carts have entered a new area to which the shopping carts are not associated;
   determining an amount of time shopping carts remain within new zones, and if shopping carts remain within a new zone for a specified period of time, designating the shopping carts as abandoned and alerting store personnel of abandoned carts and grocery store products; and
   wherein certain tracking of carts is assigned higher priority than other tracking of carts, such that a cart that has passed through a frozen meat products area will be assigned a higher priority than a cart that has passed through a frozen vegetables area but not through a frozen meat products area; and the cart that has passed through the frozen meat products area will result in an earlier abandonment alert than the cart that has passed through the frozen vegetables area but not the frozen meat products area.

* * * * *